United States Patent [19]

Simeth

[11] 4,252,059

[45] Feb. 24, 1981

[54] BEARING ASSEMBLY FOR A CYLINDER IN A PRINTING PRESS

[75] Inventor: Claus Simeth, Offenbach am Main, Fed. Rep. of Germany

[73] Assignee: M.A.N.-Roland Druckmaschinen Aktiengesellschaft, Fed. Rep. of Germany

[21] Appl. No.: 73,948

[22] Filed: Sep. 10, 1979

[51] Int. Cl.³ .................. B41F 13/20; B41F 13/28
[52] U.S. Cl. ............................ 101/218; 101/247; 101/144; 308/62; 308/238
[58] Field of Search ............ 101/218, 217, 247, 143, 101/144, 182, 184, 185, 191, 192, 137, 139, 140, 145; 308/62, DIG. 9, 238

[56] References Cited

U.S. PATENT DOCUMENTS

| | | | |
|---|---|---|---|
| 2,986,086 | 5/1961 | Siebke | 101/218 |
| 3,348,887 | 10/1967 | Sheps | 308/238 X |
| 3,352,332 | 11/1967 | Swatek et al. | 308/238 X |

Primary Examiner—J. Reed Fisher
Attorney, Agent, or Firm—Leydig, Voit, Osann, Mayer & Holt, Ltd.

[57] ABSTRACT

A bearing assembly for a cylinder in a printing press including an anti-friction bushing interposed between the spindle of the cylinder and a bore in the press frame. In contact with the outside surface of the bushing is a cylindrical layer of durable anti-friction plastic material formed of a flat ribbon which is of uniform thickness dimensioned to fit snugly to prevent any radial play between the bushing and the frame. In the preferred form of the invention two bushings are used, one inside the other, with the layer of plastic material interposed between them. At least one of the bushings may have inner and outer cylindrical surfaces which are eccentric with respect to one another and may be provided with means for rocking adjustment to provide limited throw of the spindle. The preferred form of plastic material is polytetrafluoroethylene, commonly known as Teflon.

1 Claim, 3 Drawing Figures

U.S. Patent  Feb. 24, 1981  4,252,059
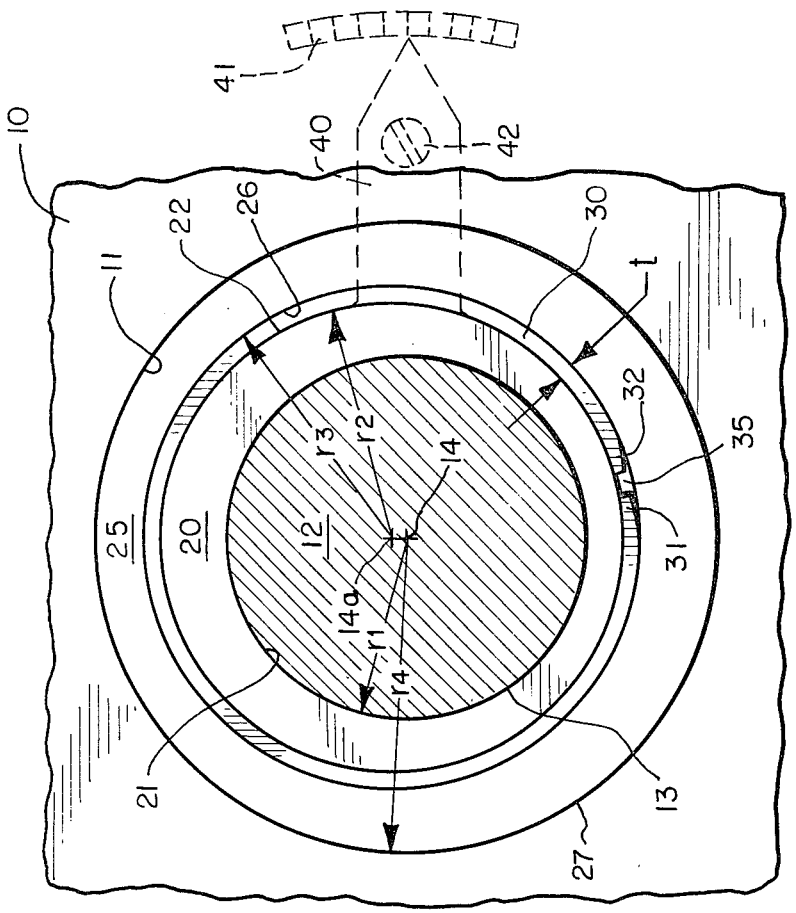
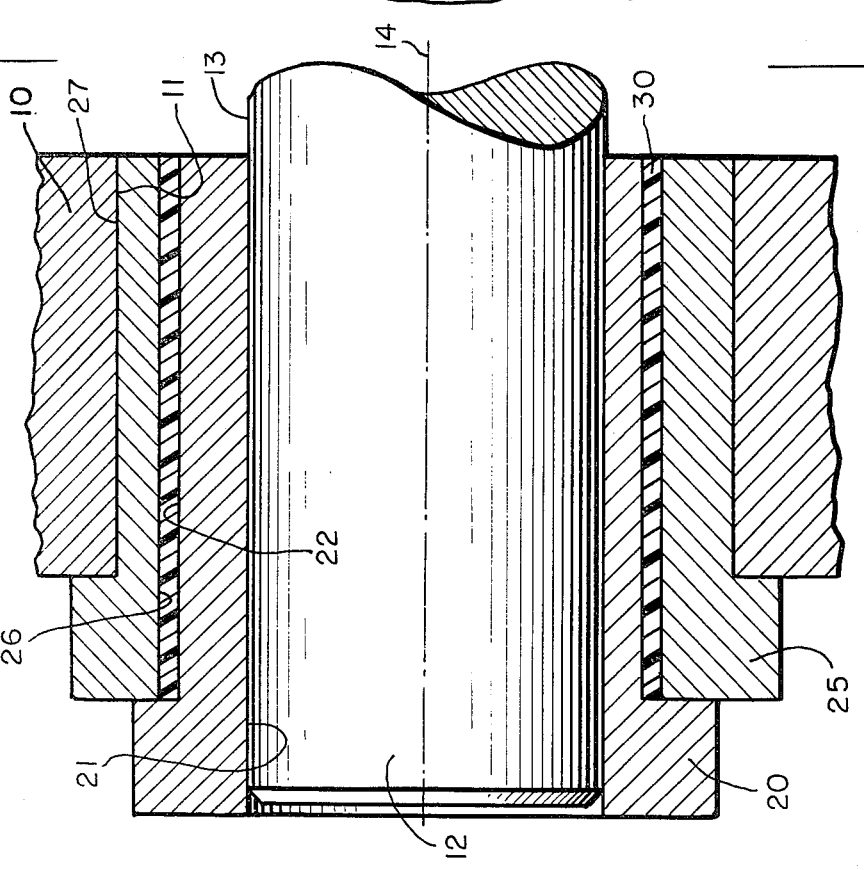

BEARING ASSEMBLY FOR A CYLINDER IN A PRINTING PRESS

In order to print on stock of different thicknesses it is necessary to provide variability in the inter-axial distance between the impression cylinder and the blanket cylinder of an offset printing press. For this purpose the blanket cylinder is usually journaled in bushings in which the inner and outer surfaces are eccentric with respect to one another. By rocking adjustment of such a bushing the distance between the blanket cylinder and the impression cylinder can be conveniently varied over a small range.

Eccentric journaling, however, has required a high degree of manufacturing precision. Because of the small amount of available throw, and because of the desirability of precise adjustment of such throw, play between the bushing and the press frame should be at an absolute minimum. For this purpose recourse is often had to needle-type roller bearings. However, such bearings are temperature-sensitive, and a temperature change of relatively few degrees may result in seizing of the bearing and consequent breakage of an associated part such as the throw-off mechanism. For this reason and for reasons of expense, needle bearings have come into only limited usage, and it has been continued to be the practice to employ sleeve type bearings while tolerating the play which is inherent in the use of such bearings.

It is an object of the present invention to provide a bearing assembly employing an anti-friction bushing for journaling a cylinder spindle in which the bushing is supported without any play whatsoever relative to the press frame. It is a more specific object to provide a bearing assembly employing an anti-friction bushing having inner and outer cylindrical surfaces which are eccentric to one another to achieve limited throw adjustment of the contained spindle and in which the throw adjustment is accomplished easily and freely whenever desired yet with complete absence of radial play.

It is another related object to provide a bearing assembly having zero bushing a play and yet complete freedom of action over a wide temperature range. Thus it is an object to provide a bearing assembly which avoids the problem which arises in conventional constructions where a close fit is achieved for the purpose of minimizing play only to find that, upon a change in temperature, the close fit constitutes an actual liability, resulting in binding and difficulty of adjustment of the bushing. In short, it is an object to provide a bearing assembly which may be economically fitted for zero play but in which thermal expansion has no effect upon the initially established freedom of adjustment.

It is still another object of the present invention to provide a bearing assembly which, in addition to its consistent anti-play characteristics provides inherent cushioning and high effective dampening of the vibrations set up in the press cylinder, particularly those vibrations which occur at high printing rates.

It is yet another object of the invention to provide a bearing assembly which is simple in construction, which is easily and quickly installed and which is universal in application capable of being incorporated not only in new presses but as a matter of retrofit in presses already in the field.

Other objects and advantages of the invention will become apparent upon reading the attached detailed description and upon reference to the drawings in which:

FIG. 1 is an axial section taken through a bearing assembly constructed in accordance with the present invention.

FIG. 2 is an end view of the assembly looking along line 2—2 in FIG. 1.

FIG. 3 is a developed view showing the profile of the flat ribbon of plastic material which constitutes the cylindrical layer.

While the invention has been described in connection with the preferred embodiment, it will be understood that I do not intend to be limited to the particular embodiment of the invention which has been shown but intend, on the contrary, to cover the various alternative and equivalent constructions included within the spirit and scope of the appended claims.

Turning now to the drawing a press side frame 10 has a cylindrical bore 11. A spindle 12 supporting a printing press cylinder, for example a blanket cylinder (not shown), and having a cylindrical outer surface 13, and axis 14 is telescoped into and through the bore 11.

Interposed between the spindle 12 and the bore are an anti-friction bushing 20 having respective inner and outer surfaces 21, 22 and an auxiliary, or outer, bushing 25 having inner and outer cylindrical surfaces 26, 27. In accordance with the present invention there is, telescoped over the outer surface of the bushing 20, a cylindrical layer of durable anti-friction plastic material, the layer being formed of a flat strip, or ribbon, of uniform thickness from substantially one end to the other, dimensioned to fit snugly in the radial direction to prevent any radial play and having a narrow gap between its opposed ends. This layer, indicated at 30, is illustrated in developed form in FIG. 3, where it will be noted that the layer, or strip, has ends 31, 32 and side edges 33, 34. The strip has a length dimension such that it will wrap around the outer surface of the bushing while leaving a narrow gap 35 between the opposed ends 31, 32. Preferably the ends 31, 32 are diagonally and matchingly cut so as to define a gap 35 which lies in a helical locus. The layer 30 has uniform thickness t and is dimensioned to take up all of the radial space between the inner and outer bushings thereby to prevent any radial play whatsoever in the bushing 20.

In the practice of the invention in its preferred form, at least one of the bushings 20, 25 has inner and outer cylindrical surfaces which are eccentric with respect to one another, with such bushings being provided with means for imparting rocking movement about the spindle axis to achieve lateral throw of the cylinder over a small range for the purpose of adjusting impression, for accommodating different thicknesses of feed stock or for throw-off. Thus the bushing 20 is so constructed that the inner surface 21 is at a radius r1 from the spindle axis while the outer surface 22 is at a radius r2 from an axis which is slightly eccentric with respect thereto and which has here been indicated at 14a.

It will be understood that means are conventionally provided for holding the bushing 20 captive with respect to the frame so that it remains stationary as the cylinder rotates but is nevertheless rockingly adjustable to determine the throw adjustment. The holding and adjusting means, for example, in the form of a lever, has been diagrammatically included in dot-dash outline as indicated at 40. It may be calibrated if desired with respect to a scale 41 and locked in adjusted position by means of a locking screw 42 or the like. It will be understood that the degree of throw obtained by the use of an eccentric bushing in the usual lithograph press is extremely small, say, on the order of a few hundredths of an inch. Thus if there is any play at all in the support of the eccentric bushing which achieves the throw, the throw adjustment is largely nullified and calibration becomes meaningless. However, in using the present invention the layer of anti-friction plastic material is so fitted as to occupy all of the space outside of the anti-friction bushing so that it has no play whatsoever. In accordance with one of the aspects of the present invention the plastic employed, in addition to its durability, is chosen to have a slippery surface even when free of any lubricant. A plastic ideally meeting these requirements is a polytetrafluoroethylene, commonly known as Teflon.

Use of such a plastic has been found to insure free and easy rotatability of the bushing for purposes of throw adjustment even under zero play conditions. It is found further that such free rotatability persists over a wide temperature swing, a temperature swing which is so great as would cause binding if the bushings were, as is conventional, closely fitted together. It is found, moreover, that use of the Teflon layer permits free adjustability even where a long time interval may exist between successive adjustments. This is to be contrasted with conventional bearing assemblies where the bushing and bore surfaces, by reason of long nonuse of the adjustment, tend to become frozen together.

While the invention has been described above using a single anti-friction bushing with provision for rocking adjustment, it is understood that the outer, or auxiliary, bushing 25 may also be of eccentric construction, with radii r3 and r4, and provided with a holding or locking element similar to that indicated at 40. By employing a pair of eccentric bushings, telescoped together, the direction, as well as the amount, of throw may be easily and precisely adjusted. Normally the auxiliary bushing 25 may be closely fitted to the press frame since it will not require rocking adjustment after its initial adjustment at the factory. However, if it is desired to make the auxiliary bushing as freely rotatable as the central, or anti-friction bushing, for example, when it is used for throw-off, a similar layer 30 of anti-friction plastic may be interposed between the outer surface 27 of the bushing 25 and the bore 11 in the frame, the layer being so tightly fitted as to preclude radial play.

Alternatively, if desired, the auxiliary bushing 25 may be omitted and the outer surface of the plastic layer 30 may be fitted directly against the bore 11 in the side frame, resulting in a construction of maximum economy.

It will be apparent to one skilled in the art that the objects of the invention have been amply satisfied. Not only is there complete absence of radial play, but two other requirements are met: complete freedom of rocking movement for the purpose of throw adjustment and a substantially constant torque characteristic over a wide temperature range. The assembly is highly economical to construct and maintain. As an important bonus advantage, the layer of plastic material serves to cushion and dampen shock and vibration which may be imparted to the cylinder spindle under printing conditions and particularly where the press is operated at a high repetitive rate. All of the prior disadvantages and limitations associated with sleeve bearings and roller bearings are simultaneously overcome and advantages are obtained which have not been obtainable with either type of bearing heretofore, all at a cost which is negligible compared to the overall cost of the press.

What I claim is:

1. In a bearing assembly for a cylinder in a printing press, the combination comprising a frame having a bore, a spindle telescoped into the bore, an anti-friction bushing interposed between the bore and the spindle, the bushing having inner and outer cylindrical surfaces which are slightly eccentric with respect to one another, means for imparting rocking movement to said bushing about the axis of said spindle and relative to said bore for adjustment of lateral throw of said cylinder and for holding the said bushing captive with respect to said frame so that said bushing remains stationary as the cylinder rotates, and a cylindrical layer of durable anti-friction plastic material on the outer surface of the bushing and axially coextensive therewith, the layer being (a) formed of a flat ribbon of constant thickness from substantially one end to the other, (b) dimensioned to fit snugly in the radial direction to prevent any radial play between the bushing and the frame and (c) having a narrow gap between its opposed ends.

* * * * *